(12) United States Patent
Tingle et al.

(10) Patent No.: US 11,285,677 B2
(45) Date of Patent: Mar. 29, 2022

(54) ROLLER INTERCHANGE DEVICE

(71) Applicant: Rolls-Royce plc, London (GB)

(72) Inventors: James Tingle, Derby (GB); Ralph D. Cope, Derby (GB)

(73) Assignee: Rolls-Royce plc, London (GB)

( * ) Notice: Subject to any disclaimer, the term of this patent is extended or adjusted under 35 U.S.C. 154(b) by 67 days.

(21) Appl. No.: 16/762,465

(22) PCT Filed: Nov. 29, 2018

(86) PCT No.: PCT/EP2018/083022
§ 371 (c)(1),
(2) Date: May 7, 2020

(87) PCT Pub. No.: WO2019/115246
PCT Pub. Date: Jun. 20, 2019

(65) Prior Publication Data
US 2021/0370622 A1    Dec. 2, 2021

(30) Foreign Application Priority Data

Dec. 12, 2017 (GB) .................................... 1720715

(51) Int. Cl.
*B29C 70/38* (2006.01)
(52) U.S. Cl.
CPC ................... *B29C 70/388* (2013.01)
(58) Field of Classification Search
CPC ................................................. B29C 70/388
USPC ........................................ 156/523, 574–577
See application file for complete search history.

(56) References Cited

U.S. PATENT DOCUMENTS

| 4,234,374 A * | 11/1980 | Frank ................... B65H 45/107 156/459 |
| 5,814,184 A * | 9/1998 | Denkins ............. B65H 35/0033 156/577 |
| 10,821,682 B2 * | 11/2020 | Hamlyn ................ B29C 70/384 |
| 2016/0114540 A1 | 4/2016 | Hamlyn et al. | |

FOREIGN PATENT DOCUMENTS

| EP | 2130666 A2 | 12/2009 |
| KR | 10-2016-0022879 A | 3/2016 |
| WO | WO-2010/055063 A1 | 5/2010 |
| WO | WO-2017/037446 A1 | 3/2017 |
| WO | WO-2017/072418 A1 | 4/2017 |

(Continued)

OTHER PUBLICATIONS

International Application No. PCT/EP2018/083022, Search Report and Written Opinion dated Feb. 28, 2019, 13 pgs.

(Continued)

*Primary Examiner* — Scott W Dodds
(74) *Attorney, Agent, or Firm* — Schwegman Lundberg & Woessner, P.A.

(57) ABSTRACT

There is disclosed a roller interchange device 200 comprising: a support 202 for mounting on a composite material lay-up head 100; a plurality of roller mounts 208 for mounting respective rollers 312, 314. Each roller mount 208 is selectively moveable to a respective engaged position relative the support 202. The engaged position of each roller mount 208 corresponds to a respective roller being held at a compaction location relative the head when the support is mounted on the head.

10 Claims, 5 Drawing Sheets

(56) References Cited

FOREIGN PATENT DOCUMENTS

Figure 1:
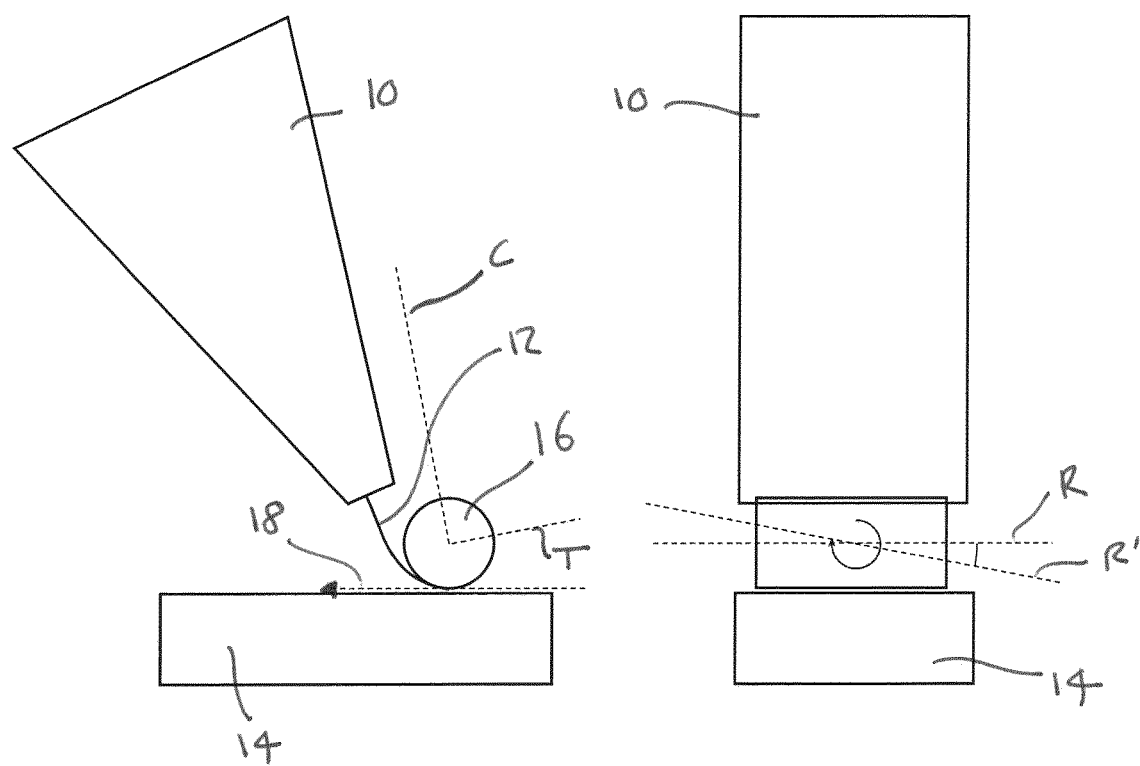

| WO | WO-2017/072419 A1 | 5/2017 |
| WO | WO-2017/072420 A1 | 5/2017 |
| WO | WO-2017/072421 A1 | 5/2017 |

OTHER PUBLICATIONS

United Kingdom Application No. GB1720715.0, Search Report dated Jun. 7, 2018, 4 pgs.

* cited by examiner

ROLLER INTERCHANGE DEVICE

This application is a U.S. National Stage Filing under 35 U.S.C. 371 from International Application No. PCT/EP2018/083022, filed on Nov. 29, 2018, and published as WO 2019/115246 A1 on Jun. 20, 2019, which claims the benefit of priority to United Kingdom Patent Application No. 1720715.0, filed on Dec. 12, 2017, each of which is incorporated by reference herein in its entirety.

The invention relates to a roller interchange device for a composite material lay-up head.

Composite materials are increasingly used for components that require particular combinations of material properties. In particular, composite materials such as Carbon Fibre Reinforced Polymer (CFRP) are commonly used for components in the aerospace and other industries due to their high stiffness and low weight.

In a lay-up process for manufacturing a composite component, a lay-up head follows a head path to lay down fibre-reinforcement material (e.g. as tows or tape) on a tool to build up successive plies of a pre-form for the component. A matrix material is either pre-applied to the fibre reinforcement material (pre-impregnated, or "pre-preg") or it is subsequently applied before curing. Lengths of fibre-reinforcement material is fed through the lay-up head, and compacted onto the tool by an applicator roller.

According to an aspect of the invention there is provided a roller interchange device comprising: a support for mounting on a composite material lay-up head; a plurality of roller mounts for mounting respective rollers, wherein each roller mount is selectively moveable to a respective engaged position relative the support; wherein the engaged position of each roller mount corresponds to a respective roller being held at a compaction location relative the head when the support is mounted on the head.

The compaction location relative the head may be a position of the roller to compact composite material from the head against a workpiece.

Each roller mount may be provided on a rotation member which is rotatable relative the support to move the respective roller mount to its engaged position. The or each rotation member may be an arm rotatable relative the support member to move the respective roller mount to the engaged position.

Each roller mount may be independently moveable relative the support to the engaged position. A controller may be provided to control movement of the roller mounts. The controller may be configured so that only one roller mount is in its respective engaged position at any one time.

Two roller mounts may each be provided on a rotation member rotatable relative the support about a centre of rotation. The two roller amounts may be at diametrically opposing positions on either side of the centre of rotation and may be constrained to rotate together. The two roller mounts may be provided on the same rotation member.

The roller mounts may be constrained to move together relative the support. Accordingly, movement of one of the roller mounts to its respective engaged position may cause another of the roller mounts to move away from its respective engaged position.

The engaged position of each roller mount may be common among the roller mounts. The engaged position may therefore be referred to as a common engaged position.

Each roller mount may be moveable with respect to at least one other roller mount of the plurality. Each roller mount may be moveable independently (i.e. independently of each other roller mount).

Each roller mount may be moveable relative the support to the respective engaged position along a linear path. Each roller mount may be moveable along a respective linear path, and the linear paths may be angularly distributed around a focus so that the engaged position of each roller mount corresponds to a respective roller being held at a common compaction location. Each roller mount may be independently moveable relative the support to the engaged position.

The linear paths may be angularly distributed about a focal axis. Each roller mount may be configured to hold a roller rotatable about a roller axis parallel with the focal axis.

The roller interchange device may further comprise a plurality of roller holders each configured to hold a respective roller and defining a roller axis for rotation of the respective roller. Each roller holder may be mounted on a respective roller mount.

The roller interchange device may be configured to hold a plurality of rollers for rotation about a common roller axis. Each roller mount and the respective roller holder may be cooperatively configured so that, with the roller mount in the respective engaged position, the respective roller axis is aligned with the common roller axis in at least one configuration of the roller holder.

At least one roller holder may be configured so that the respective roller axis is moveable with respect to the respective roller mount in translation and/or rotation, so that in use when the roller mount is at the respective engaged position, a roller held by the respective roller holder has a range of corresponding compaction locations relative the head.

At least one roller holder may have a resilient arrangement configured so that the roller holder is resiliently linearly compressible in response to compaction force through a respective roller. The linear compression may be compression of a resilient arrangement such as a spring. The term resilient linear compression is not intended to include thermal-induced strain or compression, or elastic compression of the bulk material from which the roller holder is made. In other words, the resilient arrangement may be configured so that the extent of the roller holder along a resilient linear compression axis is compressible at a rate (i.e. compression distance per unit force) greater than that corresponding to the elastic compressive strain per unit force of the bulk material.

At least one roller holder may be configured to cooperate with the respective roller mount so that the roller holder is moveable along an arcuate path with respect to the roller mount. For example, the roller holder and roller mount may be coupled by a cooperating arrangement of an arcuate rail or groove and a corresponding fitting. The arcuate path may extend around a tilt axis which is orthogonal to the roller axis and a compaction axis (along which a compaction force is applied through the roller). Accordingly, movement of the roller holder relative the mount may be to effect a change in the tilt angle of a roller axis relative a lay-up head. A lay-up head may be moveable along a first longitudinal axis, and the roller interchange device may be configured so that the compaction axis is normal to the longitudinal axis, or inclined with respect to the normal to the longitudinal axis. When the compaction axis is inclined with respect to the normal to the longitudinal axis, tilt of the roller axis causes the one end of the roller axis to move forward along the longitudinal axis, and the opposing end to move rearward along the longitudinal axis. Accordingly, when viewed in a reference frame of the longitudinal axis (i.e. corresponding to the tangent plane of the application surface or workpiece), tilting motion would have both yawing (twist) and rolling (angular movement about the longitudinal axis) components.

According to a second aspect there is provided a roller interchange assembly comprising a roller interchange device in accordance with the first aspect; and a plurality of rollers, each mounted to a respective one of the roller mounts.

At least two of the rollers may have different values of a roller property selected from the group consisting of: radius; axial dimension; material; and Young's modulus.

At least one roller holder may be configured so that the respective roller axis is moveable with respect to the respective roller mount in translation and/or rotation, so that in use when the roller mount is at the respective engaged position, a roller held by the respective roller holder has a range of corresponding compaction locations relative the head. At least two rollers may have different roller envelopes corresponding to their respective ranges of translation and/or rotation relative the support when the respective roller mount is in the engaged position. One of the at least two rollers may have a roller envelope limited to the compaction location.

The roller interchange assembly may be configured to hold a plurality of rollers to engage a workpiece at a common engagement point relative the support. Each roller mount, respective roller and respective roller holder (when present) may be cooperatively configured so that, with the roller mount in the respective engaged position, the respective roller is held to engage the workpiece at the common engagement point.

The engagement point may relate to the location at which the surface of the roller abuts the workpiece, rather than the position of the roller axis.

According to a third aspect there is provided composite material lay-up equipment comprising: a lay-up head for guiding composite material towards a workpiece; and a roller interchange device or assembly in accordance with the first or second aspect mounted on the lay-up head.

The invention may comprise any combination of features as described herein, except such combinations as are mutually exclusive.

Figure 2:
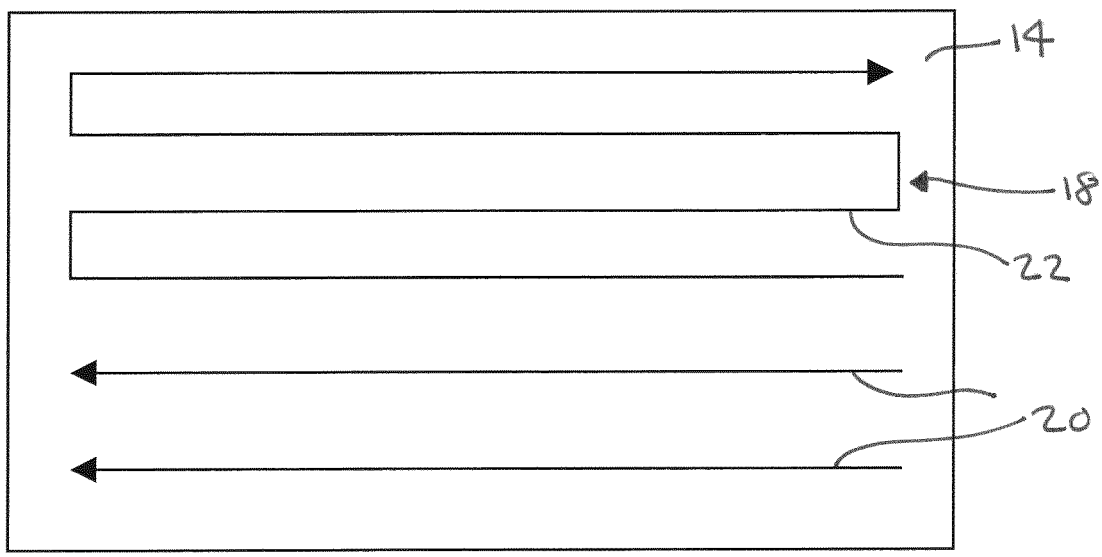
Figure 3:
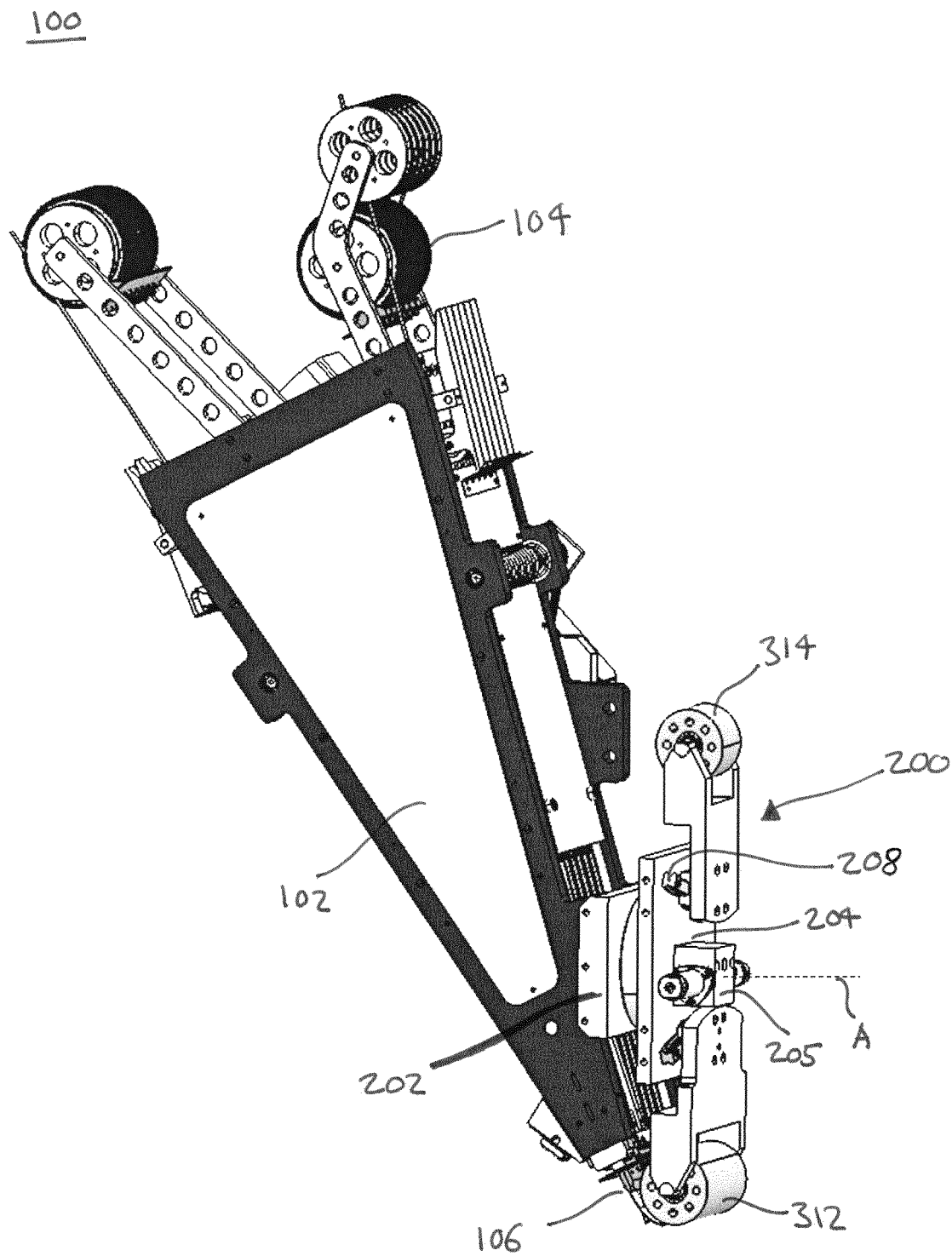
Figure 4:
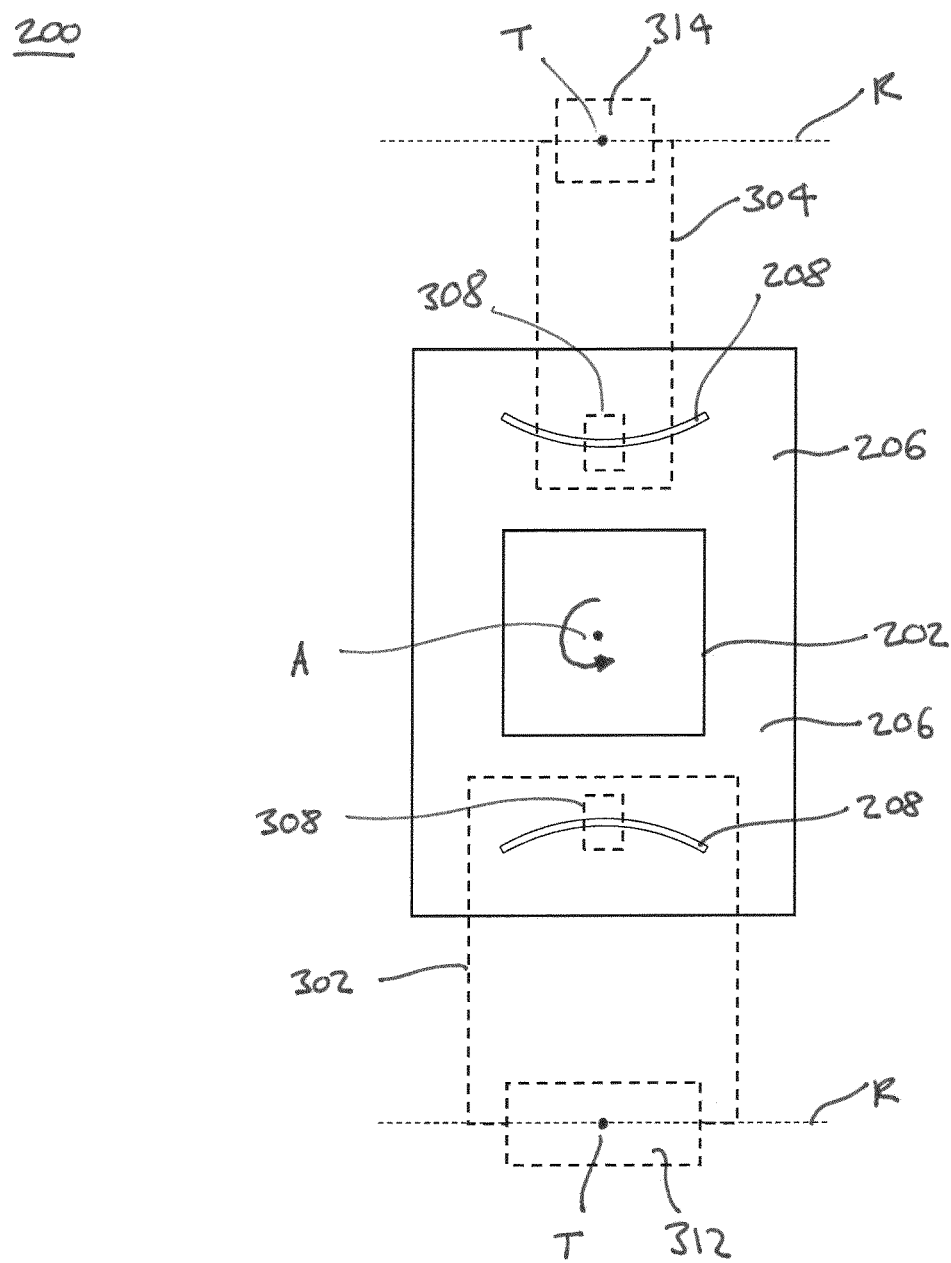
Figure 5:
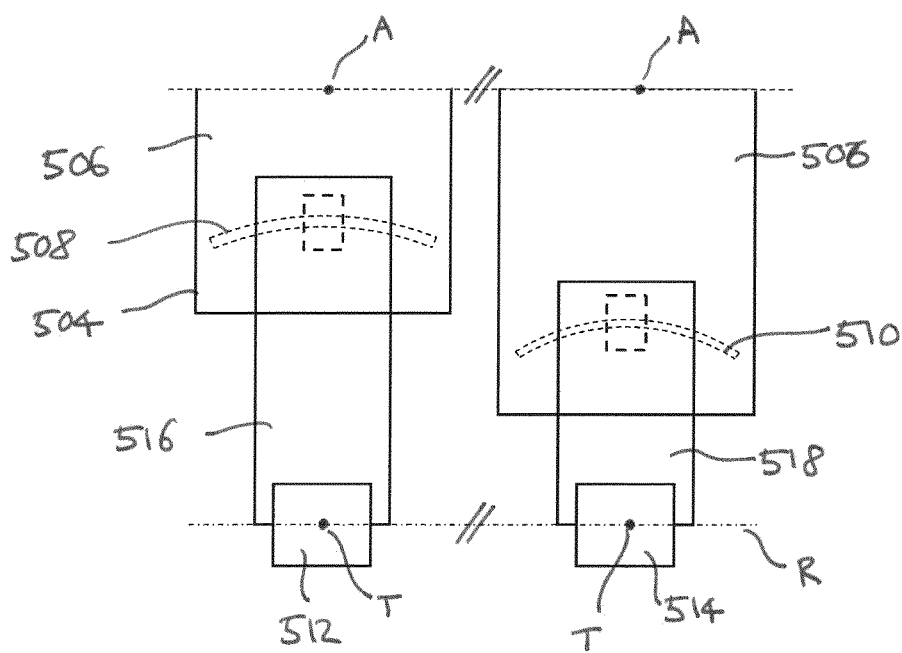
Figure 6:
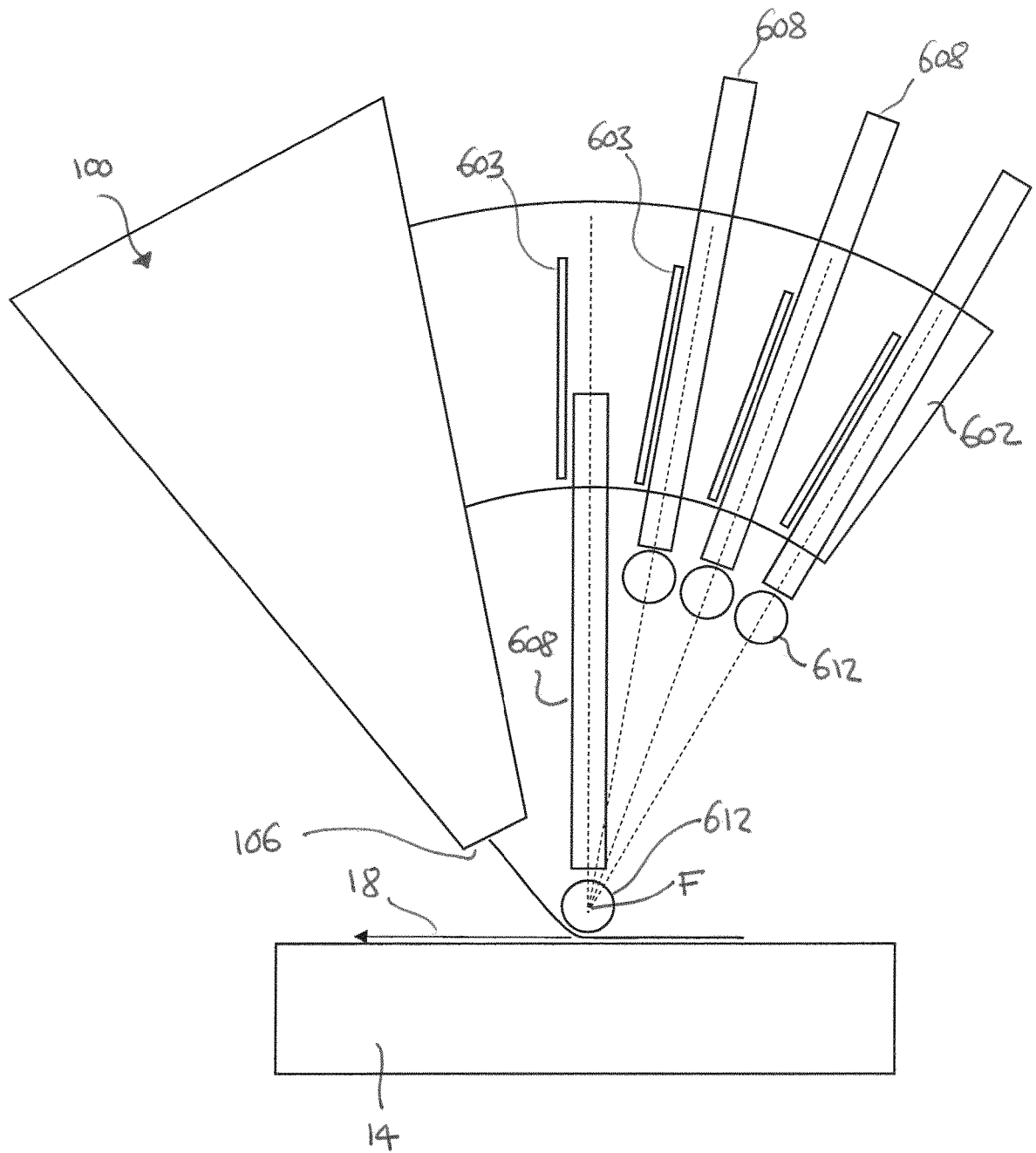

The invention will now be described, by way of example, with reference to the accompanying drawings in which:

FIG. 1 schematically shows side and front views of a lay-up head;

FIG. 2 schematically shows a head path for a lay-up procedure;

FIG. 3 schematically shows a lay-up head including an example roller interchange device;

FIG. 4 schematically shows the roller interchange device of FIG. 3;

FIG. 5 schematically shows two roller mounts with respective roller holders and rollers; and FIG. 6 schematically shows a further example roller interchange device.

An example lay-up head 10 is shown in side and front views in FIG. 1. The lay-up head 10 is configured to guide and cut lengths of fibre-reinforcement material 12 for application to a tool 14. The head 10 is generally tapered towards a tip region, and an applicator roller 16 is held at a compaction location adjacent the tip region to compact fibre-reinforcement material from the tip region onto the tool 14, as the head 10 moves relative the tool 14 along a head path 18. The head 10 is configured to apply a compaction force through the applicator roller 16 along a compaction axis C.

In this example, the applicator roller 16 is mounted for rotation about a roller axis R, and a mounting arrangement for the roller 16 is provided such that the roller axis may tilt (R') about a tilt axis T to conform to the underlying surface of the tool 14, or a partially-laid pre-form on the tool 14. In this example, the tilt axis T is orthogonal to the compaction axis and the roller axis.

The lay-up head 10 is configured to move relative the tool 14 along the head path 18 including a plurality of courses 20, 22 to apply the fibre-reinforcement material 12. As shown in FIG. 2, an example head path 18 may include an array of unidirectional courses 20 arranged side-by-side, such that the lay-up head 10 traverses from a first end of the tool 14 or component towards a second end to lay fibre reinforcement material, returning to the first end of the tool after completing each course. The head path 18 may also include bi-directional courses 22, according to which the head turns around partway through the course.

FIG. 3 shows an example lay-up head 100 comprising a head body 102 enclosing tow guiding and cutting equipment. In this example, the lay-up head 100 is to be mounted on a multi-axis manipulator for moving the head body 102 relative a tool (not shown), for example a six degree of freedom manipulator. In other examples, the lay-up head 100 may be stationary and a tool may be configured to move relative the head, or both the head and the tool may be configured to have different degrees of freedom for relative movement.

The lay-up head 100 is configured to direct fibre-reinforcement material received at a rear end of the lay-up head to a tip region 106, where the fibre-reinforcement is guided towards the tool for compaction, and may be cut. In this example, the lay-up head 100 is configured to guide and cut multiple side-by-side tows of fibre-reinforcement material, for example 8 tows. In other examples, a lay-up head may be for guiding bundles of fibres, or tape.

As shown in FIG. 3, a first applicator roller 312 is provided at a compaction location adjacent the tip region 106 of the lay-up head 100 to compact fibre-reinforcement material received from the tip region 106 against a tool.

The roller 312 is held by a roller interchange device 200 that is mounted on the lay-up head 100 for switching between the first roller 312 and a second roller 314 to be held at the compaction location adjacent the tip region 106.

In this example, the roller interchange device 200 comprises a support 202 mounted on the lay-up head 100 and a rotatable member 204 coupled to the support 202 for relative rotation with the support about a swing axis A, for example by a slew ring bearing. A rotary actuator 205 is coupled to the support 202 and the rotatable member 204 to selectively rotate the rotatable member 204. In this particular example, the rotary actuator 205 is an air cylinder actuator coupled to a controller, but in other examples any suitable actuator may be used.

The first and second rollers 312, 314 are mounted to the rotatable member 204 at opposing radial locations with respect to the swing axis A, such that the rollers 312, 314 can be switched by rotation of the rotatable member 204 relative the support. Such switching may occur, for example, between courses of lay-up procedure when a previously-engaged one of the rollers 312, 314 has been lifted away from the tool.

The example roller interchange device 200 is shown in further detail in FIG. 4. In this example, the rotatable member 204 defines two arms 206 extending in opposing directions orthogonal to the swing axis, so that the rotatable member is substantially planar in a plane normal to the swing axis A.

A roller mount 208 is provided on each arm 206 for mounting a roller to the interchange device 200. In this example, each roller mount 208 is in the form of an arcuate rail projecting from the plane of the rotatable member and configured to receive a corresponding fitting 308 of a respective roller holder 302, 304 (shown in dashed lines in FIG. 4). The arcuate rails 208 and corresponding fittings 308 of the roller holders 302, 304 are configured so that each roller holder 302, 304 can move relative the respective roller mount 208 along an arcuate path to tilt a roller axis R of a respective roller 312, 314 held by the holders 302, 304.

FIGS. 3 and 4 show a first configuration of the roller interchange device 200 in which the first roller 312 is in the compaction location relative the tip region 106 of the lay-up head, whereas the second roller 314 is in a disengaged location diametrically opposite the first roller 312.

In the first configuration, a first roller mount 208 corresponding to the first roller 312 is disposed in an engaged position of the mount 208 relative the support 202, which in this example is the lowest position (or "6 O'clock" position) of the roller mount 208 around the swing axis A. The first roller mount 208 is disposed on the rotatable member 204 at a fixed radial distance with respect to the swing axis A.

The first roller holder 302 is mounted on the first roller mount 208 and extends radially outwardly to define a roller axis R for the first roller 312 at its distal end. In the first configuration with the first roller mount 208 in the engaged position, the first roller holder 302 holds the first roller 312 in the compaction location relative the tip region of the lay-up head 100. In this example, the first roller holder 302 is moveable with respect to the roller mount 208 along the arcuate path as described above, and so the roller 312 has a corresponding roller envelope of compaction locations corresponding to the range of movement of the roller holder 302. In this particular example, the first roller mount 208 is configured so that the arcuate path provides a rotational range of movement of the roller about a tilt axis T which is orthogonal to and intersects the roller axis R defined by the first roller holder 302 at a mid-point of the roller 312 with respect to its width. Accordingly, the mid-point of the roller 312 remains static with respect to the first roller mount 208 during tilting of the roller 312, and so the roller envelope comprises a range of compaction locations corresponding to tilting movement of the roller 312 about the tilt axis T.

The first and second roller mounts 208 are statically mounted on the rotatable member 204 such that they are constrained to rotate together. Accordingly, in this example the second roller mount 208 is always diametrically opposed to the first roller mount 208 with respect to the swing axis A, irrespective of rotation of the rotatable member 204.

Rotation of the rotatable member 204 away from the first configuration by 180° causes the first roller holder 302 to move away from its engaged position to a disengaged position, and causes the second roller mount 208 to move from its disengaged position to its engaged position.

In this example, both the first and second roller mounts 208 have the same configuration of an arcuate rail, and are spaced apart from the swing axis A by the same radial distance with an angular separation between them of 180° with respect to the swing axis A. Accordingly, the engaged positions of the first and second roller mounts 208 is common between them, as are the respective disengaged positions.

In this example, the first and second roller holders 302, 304 and their respective rollers 312, 314 differ from each other in respect of the width of the rollers 312, 314 along the roller axis. As shown in FIG. 4, the first roller 312 and the respective holder 302 are relatively wider than the second roller 314 and the respective holder 304. Accordingly, in this example the roller interchange device 200 enables switching between rollers 312, 314 of different widths.

Example lay-up instructions including switching between the rollers 312, 314 in use at the compaction location during a lay-up procedure will now be described.

Lay-up instructions for use by a controller in a lay-up procedure to control lay-up equipment may be defined manually or with the assistance of a computer program. Lay-up instructions may control relative movement of a lay-up head and a tool, and the application of fibre-reinforcement material as guided through the lay-up head and applied against the tool using an applicator roller.

Lay-up instructions may include a definition of a headpath for relative movement of the lay-up head and the tool. In this example, lay-up instructions include a definition of a headpath and a variable width parameter corresponding to the width of fibre-reinforcement material to be laid. In this particular example, the width parameter is the number of side-by-side tows to be laid along a respective course of the headpath, but in other examples the width parameter may be an ID for a roller of a particular width, a width dimension, or some other suitable parameter to initiate switching between rollers.

In this example, the lay-up procedure is for a fan blade for a gas turbine engine, which has a highly variable profile along its span, with regions of relatively high curvature towards the root and regions of relatively lower curvature towards the tip.

The lay-up instructions are defined iteratively based on analysis of successive headpaths defined for the lay-up procedure to conform to the geometry of the fan blade. In particular, the curvature of the application surface (i.e. the tool or an exposed surface of a partially-laid pre-form for the fan blade) is analysed along the headpath to determine whether to use the first roller 312 having a relatively wide extent of the second roller 314 having a relatively narrower extent.

Regions of the application surface having high curvature may inhibit compaction of fibre-reinforcement material applied on the application surface. Applicator rollers are typically deformable under a compaction force to accommodate a finite amount of curvature, whether concave or convex. In particular, when the application surface is convex, the compaction force may act to depress a central region of the applicator roller so that outer regions may abut and compact the fibre reinforcement material. Similarly, when the application surface is concave, the compaction force may act to depress the outer regions of the applicator roller so that the central region may abut and compact the fibre reinforcement material.

When the application surface is highly convexly curved such that non-compaction will occur towards the outer ends of the roller, the lay-up instructions may be defined or adjusted so that fibre-reinforcement material is only applied using the central region of the applicator roller over the respective course. For example, the number of tows may be reduced to those to be applied using the central region of the applicator roller.

However, when the application surface is highly concavely curved such that non-compaction will occur towards the central region of the roller, limiting the width of fibre reinforcement material or limiting the number of tows in a corresponding way would not be effective, as the outer regions of the roller would still impact the application surface to prevent compaction at the central region.

In this example, when such non-compaction is identified or predicted during the definition of the lay-up instructions, the lay-up instructions are defined or adjusted so that a relatively narrower applicator roller is to be used for the respective course. By way of example, the lay-up instructions may be defined so that the relatively narrower second roller 314 of FIGS. 3 and 4 is used for the respective course, rather than the relatively wider first roller 312.

For courses where no non-compaction issues are identified, the lay-up instructions are defined so that the relatively wider applicator roller is used. As will be appreciated, the lay-up instructions may be defined iteratively as the width of a course may vary between successive definitions as the analysis is performed and the non-compaction is identified.

By defining the lay-up instructions to switch between applicator rollers of different widths in accordance with the above example, a lay-up procedure for a component of complex curvature may be conducted more efficiently whilst preventing forming defects owing to non-compaction. In particular, where the curvature so allows, a relatively wider applicator roller may be used to provide for efficient lay-up of material over the length of a course. In regions of higher curvature, a relatively narrower applicator roller may be used. Applicator roller widths may be selected for a particular lay-up procedure using an optimisation process.

In the above example, the lay-up instructions are defined by a computer program separate from lay-up equipment, and the properties of rollers available to the lay-up equipment is available to the computer program so that the lay-up instructions may be defined appropriately. In other examples, lay-up equipment may include a computer program (i.e. instructions stored on a non-transitory machine readable medium) to modify lay-up instructions received by the lay-up equipment so that the lay-up equipment switches between rollers according to predetermined parameters. For example, the computer program may analyse curvature of the application surface to determine a roller of appropriate width to use for each course, and may redefine courses and the headpath itself accordingly.

In other examples, the lay-up instructions for a lay-up procedure may be generic, rather than specific to any particular lay-up equipment. A controller for lay-up equipment may interpret the lay-up instructions and control a roller interchange device to switch between applicator rollers based on the instructions in the particular manner provided—for example, in the roller interchange device 200 of FIGS. 3 and 4, switching is conducted by controlling the rotary air cylinder to rotate the rotatable member 204 relative the support 202 by 180°.

In the example lay-up instructions described above, and the example roller interchange device 200 of FIGS. 3 and 4, the first and second rollers 312, 314 differ only in their widths (axial dimension). In other examples, other roller properties may differ between rollers of a roller interchange device or assembly (i.e. a roller interchange device including rollers). For example, roller properties including roller radius, roller material, or Young's modulus may vary between rollers on a roller interchange device.

In particular, a roller of relatively greater radius may be able to deform by a greater amount to accommodate high local curvature transverse to the headpath direction than a roller of relatively lower radius. On the other hand, a roller of relatively lower radius may be more suitable for regions of curvature along the headpath.

When rollers of different radii are used, their respective roller mounts may have offset engaged positions to compensate for the different distance between the roller axis and the surface of the roller, or any roller holders (when provided) may be of different lengths between the roller mount and the roller axis. Otherwise, they may have roller holders of different lengths.

A roller of a first material may be more easily deformable than a roller of a different second material. As described above, use of a more easily deformable roller over selected courses may prevent non-compaction owing to high curvature. Similarly, a roller of a relatively low Young's modulus may be more easily deformable. Conversely, use of a relatively deformation-resistant roller may improve compaction of a pre-form for a component, so as to reduce the likelihood of forming defects.

FIG. 5 shows partial views of a further example roller interchange device 500. The roller interchange device 500 of this example is similar to that described above with respect to FIGS. 3 and 4 in that it comprises a support and a rotatable member 504 including two diametrically opposed arms 506 having roller mounts 508, 510 constrained to rotate together. FIG. 5 shows a bisected view of two opposing arms 506 of the roller interchange device cut along a plane intersecting the swing axis A, so that each arm 506 is shown separately and side-by-side, rather than opposite one another. This view enables a comparison of the engaged position of each roller mount 508, 510.

As shown in this view, the radial distance between the roller axis of each roller 512, 514 and the swing axis A is equal for each roller 512, 514. However, in this example, the first roller mount 508 is relatively closer to the swing axis A along a radial direction, and the second roller mount 510 is relatively farther from the swing axis A along the radial direction. In this example, a first roller holder 516 is relatively longer along the radial direction to compensate for the relatively closer roller mount 508, whereas a second roller holder 518 is relatively shorter along the radial direction. Accordingly, despite each of the first and second roller mounts 508, 510 having different radial engaged positions with respect to the radial direction, each roller can be held at the same compaction location when the respective roller mount is in its respective engaged position. Both roller mounts 508, 510 have the same angular engaged position.

In this example, the roller envelope (i.e. the range of compaction locations the rollers can move to relative the roller mount) differs between the first and second rollers 512, 514 because the respective roller mounts 508, 510 are configured differently. In particular, in this example each roller mount 508, 510 defines an arcuate path for relative movement between the roller mount 508, 510 and the respective roller holder 516, 518, and both mounts are arcuate around a focal axis T (a tilt axis) orthogonal to and intersecting the respective roller axis R. However, the focal radius for the first roller mount is larger than the focal radius for the second roller mount. Accordingly, the dynamic tilting response of the roller may be different between the first and second rollers 512, 514. In particular, the second roller 514 may have a greater angular range for tilting movement (a greater roller envelope with respect to tilt).

FIG. 6 shows a lay-up head 100 provided with a further example roller interchange device 600. The roller interchange device 600 comprises a support body 602 extending rearward from the lay-up head 100 with respect to a headpath direction 18, and comprising an angularly-spaced array of linear support rails 603 to slideably support a corresponding angularly-spaced array of roller mounts 608 and rollers 612.

The roller mounts 608 are angularly-spaced around a focal axis F downstream of the tip region 106 of the lay-up head 100, and are each independently linearly moveable with respect to a radial direction around the focal axis F to position a roller 612 mounted thereto at the focal axis F (i.e. so that the roller axis of the roller 612 is substantially coaxial with the focal axis F).

In this example, the support body 602 is generally arcuate about a focal axis F, and the linear support rails 603 are angularly spaced apart on the support body 602 to cooperate with the roller mounts 608. Accordingly, the support rails 603 are also angularly spaced apart and focused around a focal axis corresponding to the focal axis F. It will be appreciated that the focal axis for the support rails 603 is parallel but offset from the focal axis F for the roller mounts 608.

Each roller mount 608 has a retracted position (as shown for three of the roller mounts in FIG. 6) and an engaged position (as shown with respect to the roller mount 608 closest to the lay-up head 100), and is linearly moveable relative the respective support rail 603 along a radial direction with respect to the focal axis F. For example, the roller interchange device 600 may comprise an array of linear actuators for moving the roller mounts 608 between the retracted and engaged positions.

In this example, each roller mount 608 defines a roller axis for rotation of a roller held by the roller mount 608, and is configured to hold the respective roller 612 at a common compaction location so that the respective roller axis is coaxial with the focal axis F. Accordingly, each of the rollers 612 has a common roller axis when the respective roller mount 608 is in the engaged position.

In preparation for use, rollers having different roller properties may be installed in and held by respective roller mounts 608. In use, one of the rollers 612 is selected for compacting fibre reinforcement material guided from the tip region 106 of the lay-up head. The respective roller mount 608 is actuated to move from the retracted position to the engaged position, such that the respective roller 612 is held at a compaction location with its roller axis coaxial with the focal axis F. The lay-up head 100 moves relative a tool 14 along the headpath 18 so that lengths of fibre reinforcement material are guided from the lay-up head 100 to the applicator roller 612 and compacted on the tool by the applicator roller 612.

When it is determined that a different one of the rollers 612 is required, the rollers are interchanged. In this example, the lay-up head 100 may be lifted from the tool to relieve any compaction force through the roller 612, and the roller mount 608 previously used for compaction is actuated to return along a linear path to its retracted position. The roller mount 608 corresponding to the different roller 612 determined for use is then actuated to move from the retracted position to the engaged position.

As previously described with respect to the roller interchange device 200 of FIGS. 3 and 4, the roller interchange device 600 may be controlled based on lay-up instructions, and by a controller of the lay-up head or the roller interchange device 600, to determine when to switch between rollers 612.

In this example, each roller mount 608 is configured to hold a respective roller 612 so that the respective roller axis is fixed with respect to the roller mount 608. However, in other examples each roller 612 may be held by a roller holder mounted on the roller mount 608 and configured to permit translation and/or rotation of the roller or roller axis with respect to the roller mount 608. For example, a roller holder similar to that described above with respect to the roller interchange device 200 of FIGS. 3 and 4 may be used between the roller mount 608 and a respective roller 612.

Further, in other examples, the roller mounts 608 may be moveable to hold respective rollers at different compaction locations, such that they do not share a common roller axis.

The invention claimed is:

1. A roller interchange device comprising:
   a support configured to be mounted on a composite material lay-up head;
   a plurality of roller mounts configured to mount respective rollers, wherein each roller mount is selectively moveable to a respective engaged position relative the support;
   wherein the engaged position of each roller mount corresponds to a respective roller being held at a compaction location relative to the lay-up head when the support is mounted on the lay-up head;
   wherein two roller mounts are each provided on a rotation member rotatable relative to the support about a center of rotation and configured to move each respective roller mount to its engaged position, wherein the two roller mounts are at diametrically opposing positions on either side of the center of rotation and are constrained to rotate together.

2. The roller interchange device according to claim 1, wherein the rotation member is an arm rotatable relative the support member to move the respective roller mount to the engaged position.

3. The roller interchange device according to claim 1, further comprising a plurality of roller holders each configured to hold one of the respective rollers and defining a roller axis for rotation of each respective roller, wherein each roller holder is mounted on a respective roller mount of the plurality of roller mounts.

4. The roller interchange device according to claim 3, wherein at least one roller holder is configured so that the respective roller axis is moveable with respect to the respective roller mount in translation and/or rotation, so that in use when the roller mount is at the respective engaged position, a roller held by the respective roller holder has a range of corresponding compaction locations relative to the lay-up head.

5. The roller interchange device according to claim 4, wherein at least one roller holder is configured to cooperate with the respective roller mount so that the roller holder is moveable along an arcuate path with respect to the roller mount.

6. A roller interchange assembly comprising:
   a support configured to be mounted on a composite material lay-up head;
   a plurality of roller mounts configured to mount respective rollers, wherein each roller mount is selectively moveable to a respective engaged position relative the support;
   wherein the engaged position of each roller mount corresponds to a respective roller being held at a compaction location relative to the lay-up head when the support is mounted on the lay-up head;
   wherein two roller mounts are each provided on a rotation member rotatable relative to the support about a center of rotation and configured to move each respective roller mount to its engaged position, wherein the two roller mounts are at diametrically opposing positions on either side of the center of rotation and are constrained to rotate together; and
   a plurality of rollers, each mounted to a respective one of the roller mounts.

7. The roller interchange assembly according to claim 6, wherein at least two of the rollers have different values of a roller property selected from the group consisting of:
- radius;
- axial dimension;
- material; and
- Young's modulus.

8. The roller interchange assembly according to claim 6, wherein the plurality of rollers are each held by roller holders holding respective rollers for rotation around a roller axis,
wherein at least one roller holder is configured so that the respective roller axis is moveable with respect to the respective roller mount in translation and/or rotation, so that in use when the roller mount is at the respective engaged position, a roller held by the respective roller holder has a range of corresponding compaction locations relative to the lay-up head, and
wherein at least two rollers have different roller envelopes corresponding to their respective ranges of translation and/or rotation relative the support when the respective roller mount is in the engaged position.

9. The roller interchange assembly according to claim 6, wherein the plurality of rollers are configured to engage a workpiece at a common engagement point relative the support, wherein each roller mount and respective roller are cooperatively configured so that, with the roller mount in the respective engaged position, the respective roller is held to engage the workpiece at the common engagement point.

10. Composite material lay-up equipment comprising:
a lay-up head for guiding composite material towards a workpiece;
a roller interchange device mounted on the lay-up head; the roller interchange device comprising:
a support mounted on the lay-up head;
a plurality of roller mounts configured to mount respective rollers, wherein each roller mount is selectively moveable to a respective engaged position relative the support;
wherein the engaged position of each roller mount corresponds to a respective roller being held at a compaction location relative to the lay-up head;
wherein two roller mounts are each provided on a rotation member rotatable relative to the support about a center of rotation and configured to move each respective roller mount to its engaged position, wherein the two roller mounts are at diametrically opposing positions on either side of the center of rotation and are constrained to rotate together.

* * * * *